US008935611B2

(12) United States Patent
Oberbrunner et al.

(10) Patent No.: US 8,935,611 B2
(45) Date of Patent: Jan. 13, 2015

(54) NETWORK-BASED RENDERING AND STEERING OF VISUAL EFFECTS

(71) Applicant: Vivoom, Inc., Cambridge, MA (US)

(72) Inventors: Gary C. Oberbrunner, Somerville, MA (US); Katherine Hays, Boston, MA (US); David Sturman, Brookline, MA (US)

(73) Assignee: Vivoom, Inc., Cambridge, MA (US)

( * ) Notice: Subject to any disclaimer, the term of this patent is extended or adjusted under 35 U.S.C. 154(b) by 0 days.

(21) Appl. No.: 14/349,178

(22) PCT Filed: Oct. 10, 2012

(86) PCT No.: PCT/US2012/059572
§ 371 (c)(1),
(2) Date: Apr. 2, 2014

(87) PCT Pub. No.: WO2013/055802
PCT Pub. Date: Apr. 18, 2013

(65) Prior Publication Data
US 2014/0237365 A1 Aug. 21, 2014

Related U.S. Application Data

(60) Provisional application No. 61/545,330, filed on Oct. 10, 2011.

(51) Int. Cl.
*G06F 3/00* (2006.01)
*G06F 3/0484* (2013.01)
*H04N 5/262* (2006.01)

(52) U.S. Cl.
CPC ............ *G06F 3/04847* (2013.01); *H04N 5/262* (2013.01)
USPC ......................................... 715/722

(58) Field of Classification Search
CPC ............................................... H04N 21/47205
USPC .................... 715/719–720, 722–723, 726
See application file for complete search history.

(56) References Cited

U.S. PATENT DOCUMENTS

| 8,117,317 | B2 | 2/2012 | Klimentiev et al. |
| 8,332,757 | B1 * | 12/2012 | Davey et al. ................. 715/716 |
| 2002/0116716 | A1 * | 8/2002 | Sideman ........................ 725/91 |
| 2005/0237326 | A1 * | 10/2005 | Kuhne .......................... 345/506 |
| 2006/0234765 | A1 * | 10/2006 | Herberger et al. ......... 455/552.1 |
| 2007/0183741 | A1 | 8/2007 | Lerman et al. |
| 2008/0028318 | A1 | 1/2008 | Shikuma |

(Continued)

OTHER PUBLICATIONS

"Electromagnetic Waves Can Be Used As a Data Memory" by Mikko Milenin, dated Jul. 3, 2009, retrieved from http://koti.kapsi.fi/~mmalinen/.*
International Search Report and Written Opinion for PCT/US2012/059572, Applicant: GenArts, Inc., Date of Mailing: Mar. 4, 2013, 9 pages.

*Primary Examiner* — Tuyetlien Tran
*Assistant Examiner* — Patrick Ramsey
(74) *Attorney, Agent, or Firm* — Perkins Coie LLP

(57) ABSTRACT

Systems and methods for applying visual effects to video in a client/server or cloud-based system are described. Using a web browser, for example, users can apply and control both simple and sophisticated effects with dynamic real-time previews without downloading client-side software. Rendering and previewing of the effects is done on the server and rendered images can be sent in rapid succession to the client, allowing simple, real-time feedback and control. Other aspects of the technology are also described.

20 Claims, 6 Drawing Sheets

(56) References Cited

U.S. PATENT DOCUMENTS

| | | | |
|---|---|---|---|
| 2008/0172704 A1* | 7/2008 | Montazemi | 725/105 |
| 2009/0225076 A1 | 9/2009 | Vlietinck | |
| 2010/0262710 A1* | 10/2010 | Khatib et al. | 709/231 |
| 2010/0274714 A1* | 10/2010 | Sims et al. | 705/40 |
| 2010/0293190 A1* | 11/2010 | Kaiser et al. | 707/769 |
| 2011/0113361 A1* | 5/2011 | Bhatt et al. | 715/781 |
| 2011/0235998 A1* | 9/2011 | Pond et al. | 386/280 |
| 2012/0151308 A1* | 6/2012 | Falkenberg et al. | 715/201 |

* cited by examiner

NETWORK-BASED RENDERING AND STEERING OF VISUAL EFFECTS

CROSS-REFERENCE TO RELATED APPLICATION(S)

This application is a National Stage of, and claims the benefit of, International Application No. PCT/US2012/059572, entitled "Network-Based Rendering and Steering of Visual Effects," filed on Oct. 10, 2012 and published on Apr. 18, 2013, which claims priority to U.S. Provisional Patent Application No. 61/545,330, entitled "Method For Network-Based Rendering And Steering Of Visual Effects," filed on Oct. 10, 2011, each of which are herein incorporated by reference.

BACKGROUND

Visual effects include the various processes by which imagery is created and/or manipulated on film and/or video data. Visual effects are often implemented digitally by processing successive frames of video or scanned film footage. Each frame or set of frames of digitized video is processed by computer algorithms which produce output frames corresponding to the input frames, processed by the effect(s) in question. A collection of one or more effects is defined herein as a look.

Visual effects are usually applied in a computer system, where frames are read from a disk or storage device into the computer, the frames are processed, and written to the same or a different storage device. The effects are controlled either interactively by a user (the video creator), or in batch using a predefined script.

In the interactive case, the video creator uses a "host" application such as Adobe After Effects, Autodesk Flame, Avid Media Composer or similar video editing or compositing applications to (a) identify the frame sequence to apply the effects to, (b) select the effects, (c) set the various parameters which control the final look of the effect, and (d) render the effects by performing the image-processing algorithms on all frames in the sequence. Controls might include blur amount, image shift, strength of color correction, position to apply an overlay image, and many others, as required by the look.

DETAILED DESCRIPTION

Visual Effects

Figure 1:
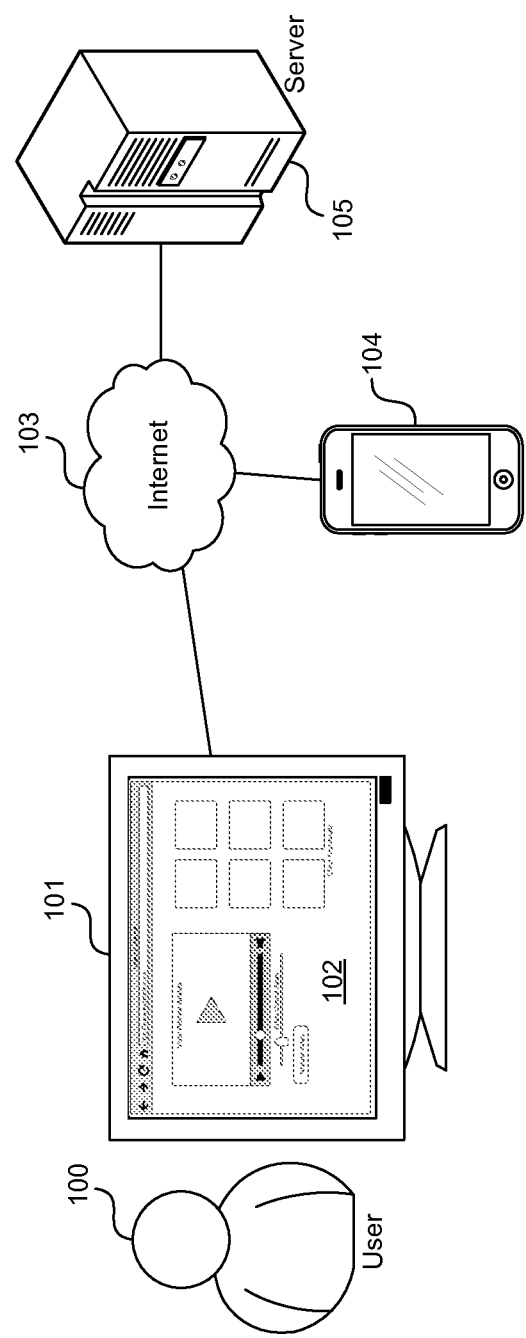
FIG. 1 is a block diagram illustrating an environment in which the disclosed technology may operate.

Various examples of the applicant's invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in below.

Client/Server Video

Increasingly video creators are uploading videos to cloud-based web servers where the videos are stored and streamed to users worldwide; examples include Vimeo, YouTube, and many others. These cloud-based systems allow creators and developers to take advantage of distributed hardware and/or software computing resources provided as a service over a network (e.g., the Internet). Editing and compositing of video using online applications is only beginning to be done with systems such as Clesh, YouTube Video Editor, and Kaltura. The present system, described in detail herein, provides a mechanism to add sophisticated visual effects capabilities to those systems as a natural part of an online creation and editing process. Current online and cloud-based video editing systems either do not include significant effects, or include only very simplistic or low-quality effects which do not require even seconds of rendering time nor provide the ability for users to control or steer them.

The disclosed techniques seek to improve the situation described above. Effects processed on a client computer require a video to be downloaded to the client and re-uploaded when complete, which is inefficient compared to the methods in the present system. Techniques for processing effectively and efficiently on a cloud-based server while using standard software and hardware components in client devices rely on a sophisticated set of interactions and data exchange between client and server, such as the systems and methods described herein.

Systems and methods for applying and controlling or steering the application of high-quality effects to video in a client/server or cloud-based system are disclosed. High-quality effects (e.g., blurs, warping, rays, and shake reduction) are commonly more sophisticated and take more computation time per frame than lower quality effects (e.g., simple color transformations), and often have more controllability. Some distinguishing features of high quality effects are that the underlying computer algorithms are antialiased (no "stair stepping" or "pixelation"), use a nearly unlimited color space such as floating point arithmetic, provide for accurate color rendition, and because of the advanced computational algorithms, produce a result which is more realistic looking than lower quality algorithms. Advanced computer code such as that used in high quality effects often enables more flexible control of the looks of the effects, adding to the realism and thus the perceived visual quality.

In one embodiment, seen in FIG. 1, the video creator Desktop User A (100) uses a desktop computer (101) with a standard web browser such as Firefox, Internet Explorer, or Google Chrome (102). The browser connects to a cloud server farm (105) via the Internet or any similar network such as a mobile data network or private network (103). The user is able, by means of a web page running in the browser, to apply effects to sets of video frames, and adjust the controls of those effects dynamically, in real time. For example, the effects may include lens flares, shake addition, old-film styles, old-TV styles, transitions, stylistic renderings (halftone, sketch, oil paint, etc.), cartoon looks, glows, video-feedback, motion blur, frame rate conversion, sharpening, vignettes, kaleidoscopes, embossing, adding textures, simulated natural phenomena (lightning, fire, smoke, rain, snow, northern lights, rainbows, etc.), and so on. The present system allows for the user to see the effects of their adjustments immediately (or near real-time), as well as initiating and controlling batch renders of large numbers of video frames. The video creator user (100) may also be using a mobile device (104) with a browser in a similar fashion.

Figure 2:
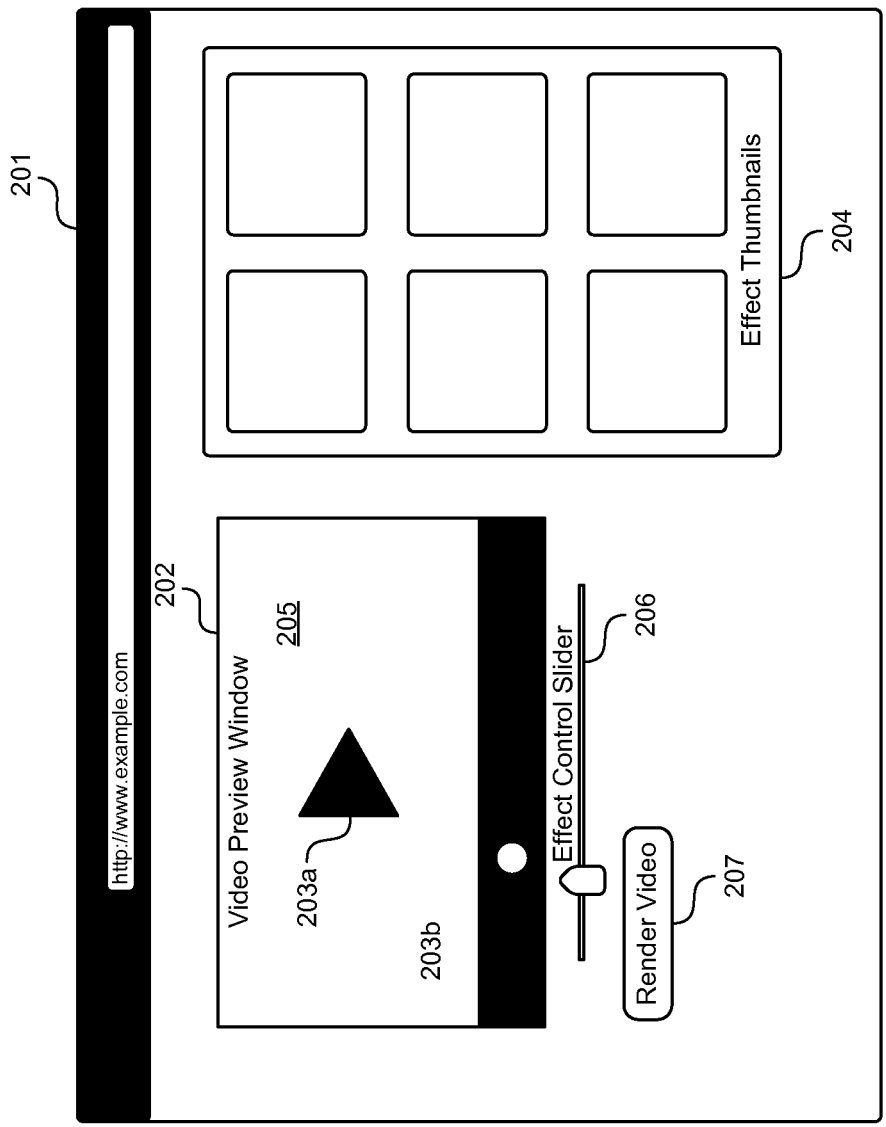
FIG. 2 is a display page illustrating a user interface through which a user can apply effects to a video clip and make adjustments to the video clip and/or the effects.

Referring to FIG. 2, in one embodiment, the user uses a standard web browser (201) to apply effects to a video clip, and makes adjustments dynamically (at will). The video appears in the Video Preview Window (202), and can be played using the Play Button (203a, 203b). Effects appear in the Thumbnail Panel (204); the user may choose one or more effects from that panel to be applied to the video clip (205). To adjust or steer the effect, one or more Effect Control Sliders (206) are provided; the user can drag them and see the results in real time in the Video Preview Window. When the user is satisfied with the effect, he may render the completed video using the Render Video button (207). Alternatively, the system may speculatively render all or part of the video without user intervention. In some cases, the user can drag the Effect Control Sliders as the video is being played, and the altered effect(s) will be visible immediately, or within a short delay, as the video plays, giving the user real-time feedback on the changes effected by the control.

Figure 3:
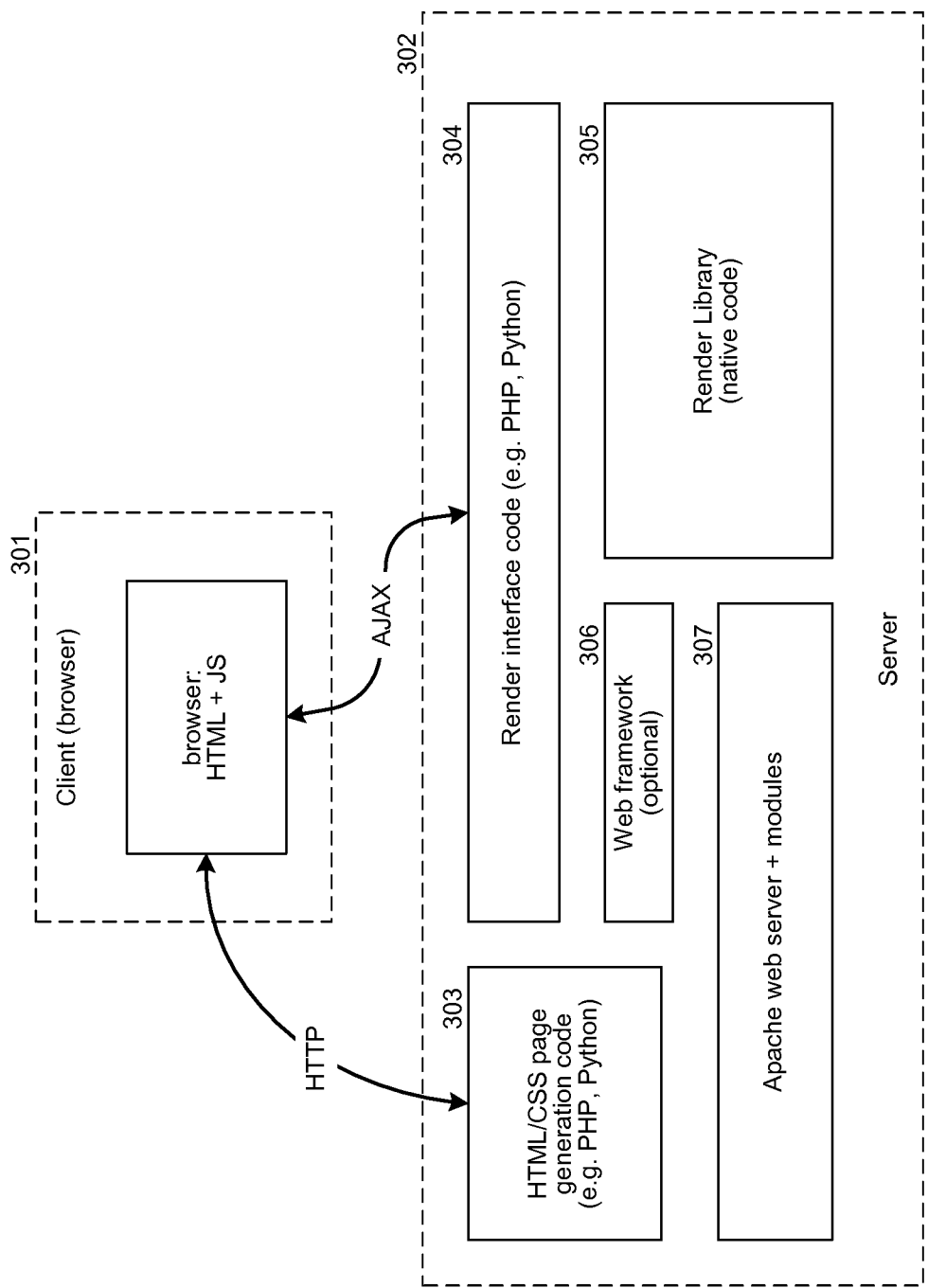
FIG. 3 is a block diagram illustrating a software architecture that may be employed by the disclosed technology.

The Software Architecture Diagram of FIG. 3 describes one possible overall structure of the application (though not the only one possible; others are clearly evident to persons skilled in the art). The client (301) (which may be running on a desktop and/or mobile device) connects via a set of standard Internet protocols such as TCP/IP and HTTP through its web browser or similar application to a remote server program (302) running on one or more server computers. The server process or processes contain functions and/or modules to generate web page content (303), create and manage the user interface for rendering and steering the effects (304), a standard web server (307) such as Apache or Microsoft Internet Information Server or other, and the Render Library (305) which contains the effect processing and rendering code. It may also contain various other modules as part of normal operation, such as a Web framework (306). It is a feature of this system that the client user does not have to install any special software to perform the application, beyond the usual operating system and web browser already found on most modern computers.

The HTML/CSS page generation code (303) is used to deliver the web page (HTML and CSS) to the browser client, as well as JavaScript (JS) code to be executed in the browser. The HTML/CSS page generation code may be implemented using static HTML or any web server-side language such as PHP, JavaScript, Java, Python or others. The Render interface code (304) is used as an intermediary between the browser (301) and the Render Library code (305) and responds to asynchronous requests from the browser, manages the Render Library code, and formats messages for delivery to the browser. The Render Library code (305) implements the processing of the effects and processes the video pixel data for each frame, using the selected effect and parameters provided by the user.

Figure 4:
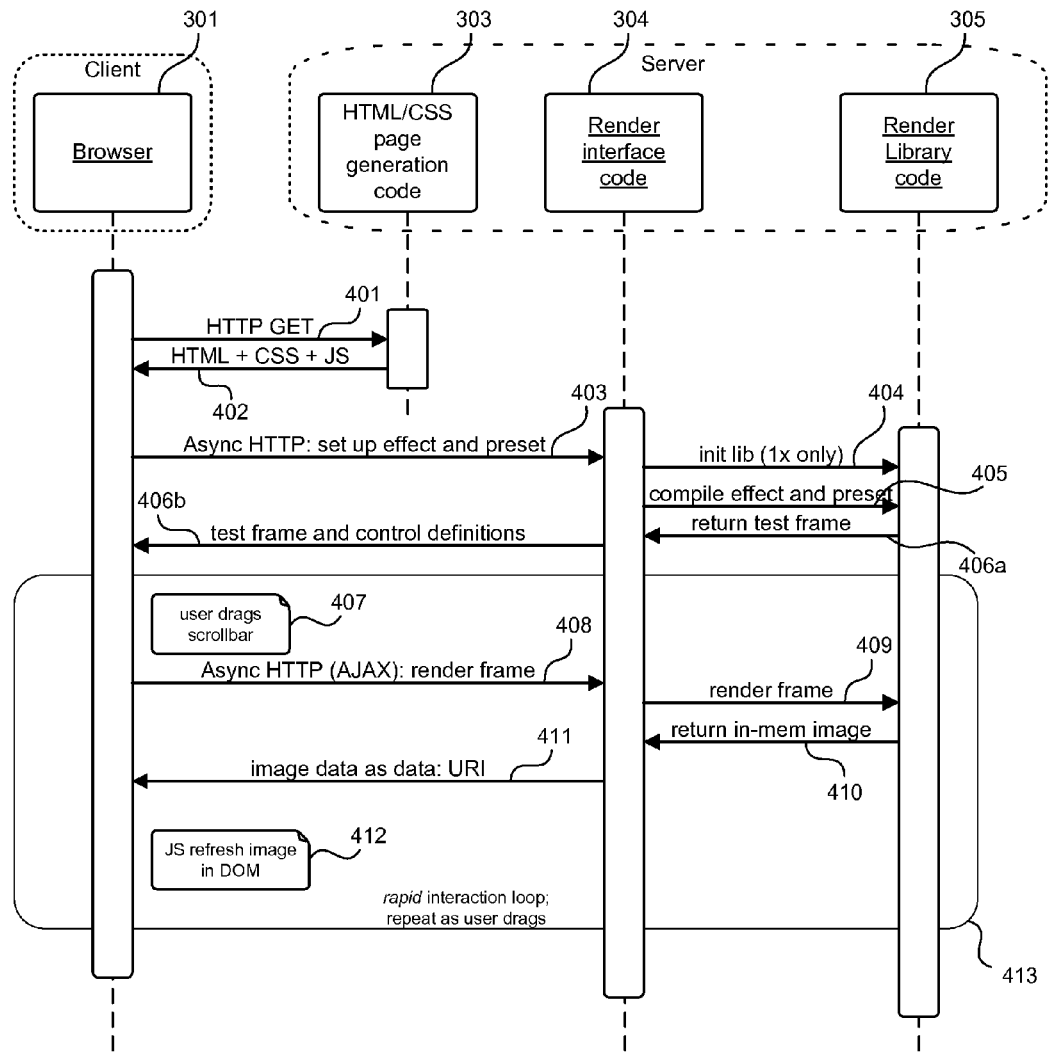
FIG. 4 is a timing diagram illustrating a transaction between a client browser and various components of a server.

Referring to the Interaction diagram of FIG. 4, which describes a possible timeline of events, the first column shows events happening in the browser. The three columns to the right show three distinct parts of the server software. This diagram is only for illustration; many other similar embodiments are possible, for instance using a different number of server processes, omitting the render interface code and folding it into the render library code, or different styles and numbers of messages exchanged.

The browser (301) initiates the conversation with the server code (307), such as via an HTTP GET command (401). The server returns (402) code (e.g., HTML+CSS+JavaScript) which is interpreted by the browser to show the user's videos and a selection of possible looks to apply. The user indicates, such as by pointing, drag-and-drop or similar means, the intent to apply a particular look to a particular set of video frames. Messages (403) are sent to the server, which collects the video frames, invokes the Render Library software to apply the looks, and optionally one more text or binary preset files describing the look to be applied and various metadata about that look (404, 405). It then renders one or more test frames which are sent to the user (406), which can occur nearly immediately. The server also sends to the browser in (406) a description of the controls available to steer or adjust the look. The browser interprets that description and displays the controls, which may take the form of knobs, buttons, sliders, menus or other common controls, as well as on-screen direct manipulation using mouse or touch screen input, for instance to indicate an X,Y spatial position relative to the video frame, or to adjust or control a parameter value. For example, the parameter values may include brightness, saturation, strength, position (e.g., for an X/Y control), width, length, quality, zoom, color (e.g., with a color chooser or color picker), detail, speed, randomness, tint, blur amount, mix, enable (e.g., yes/no checkbox), angle, combine, threshold, invert, opacity, reverse, variation, style, sharpen, and so on.

The user may then interact (407) in real time with those sliders or controls; each update of a control is sent to the server (408), which renders one or more frames (409) and sends them immediately to the browser (410, 411, 412), providing nearly instantaneous feedback to the user about the effect of that control. This interaction occurs rapidly so the video frame appears to reflect the result of the change in the slider or control as the user moves it. The entire loop (412) consisting of steps 407-412 is repeated rapidly.

A sample interaction between a client and a server is provided below:

User opens browser and selects URL of video server (e.g.: http://video.genarts.com) (401)

Server responds with initial web page contents (402), including HTML text, images, cascading style sheets (CSS) styling, and JavaScript (JS) or other scripting language code to run in the browser.

The JavaScript (JS) code asynchronously sends information to the server to set up the current effect and any preset parameters. (403)

The render code on the server initializes the effect rendering library, sets the library up to render that effect with given parameters, and creates the user-visible controls from the control definitions (404, 405, 406a, 406b)

The remainder of the interaction happens, such as in a very rapid loop (413):

The user drags a scrollbar in the browser web page (407)

The JS code is notified of the user's action and initiates an asynchronous server request, telling the server to render the current frame of video with the newly modified parameter represented by the scrollbar value (408)

The server receives the new parameter data and renders the frame in memory (409, 410)

The server builds an HTTP reply packet using the in-memory image data and any other metadata; this packet can consist of multiple elements including the image data (PNG format in this example) (411)

The reply packet is delivered to the browser's JS code, which causes the browser to render the new image (412). The result, to the user, is dynamic near-real-time control and updating of the image or video.

Figure 5:
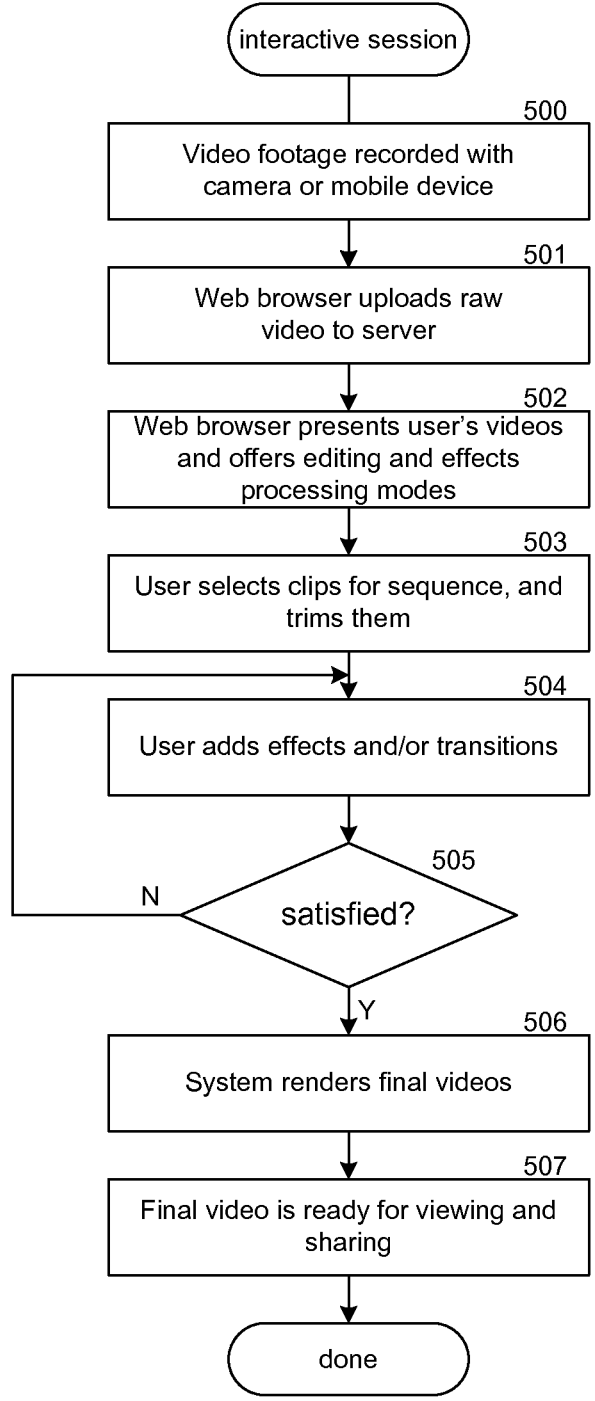
FIG. 5 is a flow diagram illustrating the processing of an interactive session.

The system described herein typically works within a larger video storage, transcoding and playback system. To explain this context, an example of an interaction session is provided (for illustration only), referencing the flowchart in FIG. 5:

User takes video footage with camera or mobile device (500) with a video capture source User uses web browser to upload raw video to server (501)

Web browser presents user's videos and offers editing and effects processing modes (502)

User selects a number of clips to combine into a sequence, trims to suit, and then begins to add video effects and transitions (503).

At this point (504) the system described herein, utilizing the software architecture in FIG. 3 and the messages and data exchanges as illustrated in FIG. 4, allows the user to add effects in the manner described herein.

If the user is satisfied (505) with the result, either: final rendering happens automatically in the background (without user interaction) or the user explicitly signals server to begin final render (506).

After rendering is complete, the processed video is ready for viewing and optional download or distribution (507).

Additional Features/Embodiments

At any time the user can play back the video, or search within it using various standard timeline techniques such as a time bar indicating the position of the virtual play head. At all times the user can see the current effect(s) applied to the video.

In the case where the desired effect involves a transition between video clips, the user may select a transition point (a cut between two video segments) and then the server (again through the browser) reveals a selection of possible transition effects. The user chooses one and can immediately see the results, using the method described herein.

Note that optional "advanced" modes may be available with slider and/or numeric parameters to steer or control the effect, in the ways described above.

Whenever the user selects a new look or transition or adjusts any parameter, the server can be immediately notified using the methods of this system and the server renders the selected effects onto the video, possibly using caching and lookahead methods to avoid excess computation and improve interactive response to provide a near immediate response. Caching is achieved by storing previously rendered frames in memory or on disk, and associating those frames with appropriate parameter values in such a way as to be able to quickly recall those frames if the user requests the same frame with the same parameter values in the future. Lookahead is used to speculatively render ahead of the current play head position, anticipating that the user will likely want to see those frames. Various statistical or heuristic methods for this can be used, such as detecting idle server capacity and rendering one or two seconds ahead using the idle CPUs.

Note that the server may continuously be streaming processed video to the client during this process, so the user can also use this system in a mode whereby s/he is effectively altering the processing of a running video stream as it is streamed. In this mode, there is a continuous feedback loop, where the client provides feedback to the cloud and receives updated video in (near) real time, which allows the user to make finely controlled adjustments and see the results of those adjustments quickly. Nothing in the present system requires processing the same frame repeatedly, so this is a natural enhancement. The messaging and data flow in FIG. 4 does not materially change, although the effect messages become interleaved with video frames being played out.

Note that, especially in the case where the server is continuously streaming the processed video, the server may record the slider control values at the time when each video frame time is being displayed, in such a way as to be able to reproduce the changes in the slider position and thus the related parameters at a later time, or during rendering. This allows the user to animate the slider values as the video is playing, so as to (for example) fade the effect in or out.

Note that the user may be using a browser on a mobile device, such as a phone or tablet. This system permits use on a less capable or smaller client device, compared to rendering effects directly on the device, since most of the detailed image processing is in the cloud (e.g., one or more devices remote from the mobile device). It also permits much more computationally complex effects and effects with higher visual fidelity, which are more computationally expensive, while maintaining a fixed frame rate to the client. More server resources can be dynamically allocated to compute effects of arbitrary complexity while the client remains very simple, with low resource requirements.

Note that the user may at any time request the server to render the entire sequence of frames in a batch mode, with later notification. For example, the user may elect to be notified upon render completion via text message, popup window, or other means. The notification may include the URL to access the modified video. This may be especially useful on a mobile device, where the user uploads a video taken on the phone, and does not have to use the device's CPU (and thus its battery power) to process the video. They can turn off the device entirely and wait for the completion notification.

Users may also process the same video with different effects and compare the results either side by side or by using analytics to measure audience engagement. This can be done in the browser by, for example, selecting an applied look and replacing it with an alternate look, selected either by the user or recommended by an algorithm on the server. Two or more versions of the video could be shown to viewers either side-by-side or sequentially, with a method (such as a button in the browser) to select which version the viewer prefers. Alternatively, different versions of the video with different effects applied could be shown to different users to measure the users' preferences for certain effects.

Users may also process several videos using the same set of effects; a feature of this system would enable users to select one or more looks and transitions applied to a set of video clips, store them for later use, and apply the same set of looks and transitions to a different set of video clips. For example, in an advertising scenario, many advertisements may share the same basic template. This feature would allow users to quickly and easily apply the same set of looks to all of the advertisements, to give them a consistent look, thus communicating the desired branding.

Note that the fact that the video frames are rendered on the server rather than in the user's browser generally means much more computational power is available for such rendering; this allows effects of much greater complexity and beauty to be used, compared with systems which render frames directly in the browser or on a mobile device. In one embodiment, the video frames are distributed to multiple physical servers for rendering, decreasing the total time to render the entire sequence. This also makes the processing/rendering time independent of the processing power of the user's device, so a simple mobile phone can create very complex effects. Different servers might be made up of hardware with different capabilities, such as graphics processing units, faster floating point hardware, or increased memory, which would enable those servers to be used to process particular effects which took advantage of the capabilities of those servers.

In another embodiment of the system, rendering and playback tasks can be split between client and server. The client may render less-complex effects, or low resolution proxy images, while sending instructions to the server to render higher quality images asynchronously. These higher quality images, when ready, can replace the lower quality ones rendered by the device. Alternatively, in a restricted bandwidth situation, the device may do local playback of cached rendered frames rather than constantly streaming from the server.

Figure 6A:
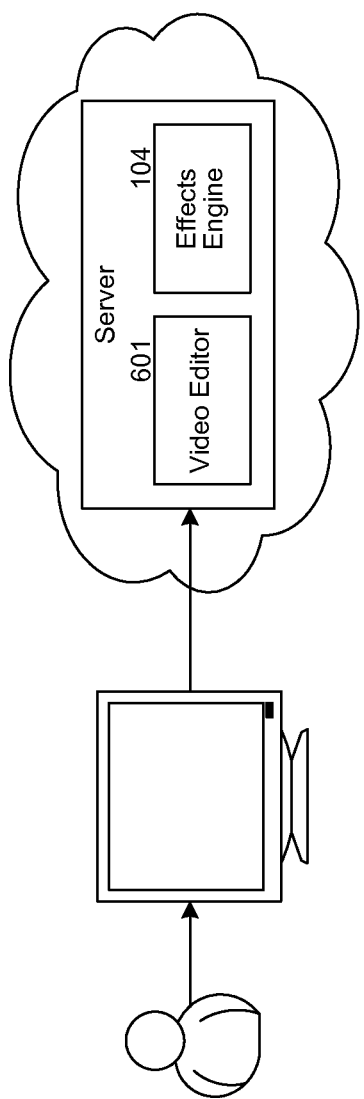
FIG. 6A is a block diagram illustrating an environment in which the disclosed technology may operate and that includes a video editor and effects server that are co-located.
Figure 6B:
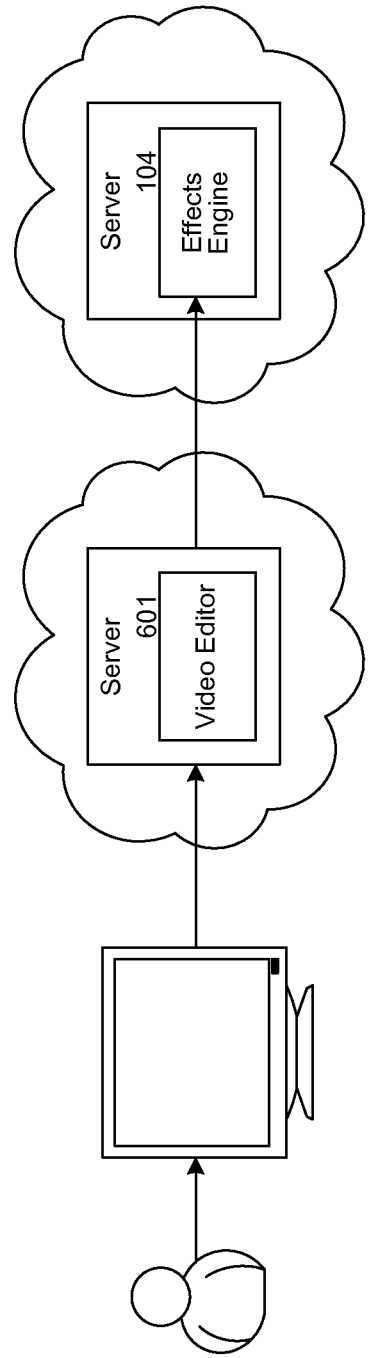
FIG. 6B is a block diagram illustrating an environment in which the disclosed technology may operate and that includes a video editor and an effects server located in different networks.

In another embodiment, referencing FIG. 6, an online (cloud-based) video editing or compositing application 601 may exist between the user (100) and the effects server (104) described herein, managing the user's interaction and passing instructions to and from the server through an API. In this embodiment, the online application may send instructions and data and receive instructions and data from the server in interactive or batch modes, in concert with or independently from the user's interaction with the editing online application. FIG. 6a shows an embodiment with the video editor and effects server co-located, and FIG. 6b shows an embodiment with the video editor and effects server on different networks.

In some examples, fidelity of the browser images may depend on the bandwidth between the client (browser) and server. Higher bandwidth connections allow both higher quality (containing fewer compression artifacts) and higher resolution images, and faster frame rates (number of frames per second). These variations in image fidelity could be adjusted dynamically and automatically by the system measuring the connection bandwidth, and/or can be specified by the user up to the limits of the physical devices. Note that the resolution of the local device does not affect final output resolution or quality. The server may render low-quality images as previews to send to the user's device, while simultaneously or sequentially rendering high-quality images for final output. Such resolution switching could be used, for example, to send lower resolution images to a small mobile device and high resolutions to a desktop, or to send low resolution or low-quality highly compressed previews while adjusting the effect to achieve lower latency feedback. The server can perform this switching based on querying the device and network capabilities, without user intervention.

Fidelity of the final rendered videos may depend on server resources. In some cases, users may select quality levels appropriate to their usage model, which could include paying more for more computational resources, either to improve quality (e.g. resolution) or shorten processing time by using more server processors.

Use of standard technology such as the Apache or IIS web servers, PHP or Python computer languages, and/or web browsers such as Internet Explorer, Firefox or Chrome allows an innovative user experience without users needing to download and install custom applications, namely the highly interactive steering of effects running on the server.

When the user is not interacting with the browser and the server is idle, the server may render other frames of the video speculatively, to improve interactive response in the case that the user desires to see other nearby (typically subsequent) frames of the video using the current parameter settings. Those cached frames may be kept or deleted when the user subsequently changes other parameter settings. The server may be running multiple processing threads, so as to maximize utilization. The speculative rendering threads would have lower priority, so they run only when nothing with a higher priority needs to be done.

The techniques disclosed herein may be applied to audio effects, wherein the audio is streamed from the server and the user manipulates various parameters of the audio effects such as reverberation, filtering, noise reduction and gain while the audio is playing or while a short sample is looped along with adjustable or controllable parameters, such as octaves, amplitude, frequency, and so on. This would involve replacing the core server rendering library with a similar library for creating and rendering audio effects and extending the data transfer protocols, while keeping most of the other parts of the system unchanged.

The techniques disclosed herein may be applied to 3-d rendering and modeling of realistic and/or nonrealistic scenes for use in films or videos, games, architectural rendering, or other uses. The user can control via the browser the creation, modeling, animation, and rendering of such scenes, while the actual modeling, animation and rendering occur on a server or servers. This would involve replacing the core server rendering library with a similar library for modeling, animating and/or rendering 3-d scenes and extending the data transfer protocols, while keeping most of the other parts of the system unchanged.

CONCLUSION

Those skilled in the relevant art will appreciate that the invention can be practiced with various computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor or any device capable of communicating with a network, including consumer electronic goods such as game devices, mobile devices (e.g., mobile phones), cameras, video capture devices or source, or other electronic devices having a processor and other components, e.g., network communication circuitry.

Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Data structures and transmission of data particular to aspects of the invention are also encompassed within the scope of the invention.

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including computer-readable storage media, such as magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on computer-readable propagation or transmission media (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The above detailed description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or steps are presented in a given order, alternative implementations may be implemented in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above detailed description. While the above description describes certain examples of the invention, and describes the best mode contemplated, no matter how detailed the above appears in text, the invention can be practiced in many ways. For example, one of ordinary skill in the art will understand that, in addition to the visual and audio effects described herein, the techniques described herein can be used to apply other visual and audio effects to video and audio data. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description explicitly defines such terms.

We claim:

1. A method, performed by a computing system having a processor, for applying visual effects to video data, the method comprising:
   receiving video data from a first video capture source, wherein the video data comprises one or more video frames;
   sending, to a remote rendering server, a least a portion of the one or more video frames;
   receiving, from the remote rendering server, a web page, wherein the web page specifies one or more controls for applying visual effects to the video data; and
   with a browser executing on a processor of the computing system,
      providing for display an indication of one or more visual effects that can be applied to the received video data,
      receiving, from a user, a selection of at least one visual effect to apply to the video data,
         wherein the at least one visual effect has at least one associated controllable parameter,
      sending, to the remote rendering server, an indication of the selected at least one visual effect to apply to the video data,
         wherein the remote rendering server is configured to apply the at least one visual effect to the video data,
      receiving, from the remote rendering server, modified video data,
         wherein the modified video data comprises one or more video frames modified based on the selected at least one visual effect,
      providing the modified video data for display,
      while the modified video data is being displayed,
         receiving, from the user, an indication to modify the at least one controllable parameter associated with the at least one visual effect,
         sending, to the remote rendering server, the indication to modify the at least one controllable parameter associated with the at least one visual effect, and receiving, from the remote rendering server, second modified video data based on the modified at least one controllable parameter associated with the at least one visual effect, so that the user can dynamically steer the application of the at least one visual effect to video data by the remote rendering server in real-time, and providing the second modified video data for display.

2. The method of claim 1, wherein the computing system is a mobile telephone and wherein the video capture source is a camera of the mobile telephone.

3. The method of claim 1 wherein the at least one visual effect is at least one of a blur, warp, rays, shake reduction, color transformation, fade, wipe, biaxial wipe, or still image insertion effect.

4. The method of claim 1, wherein the video data has associated audio data, the method further comprising:

providing for display an indication of one or more audio effects that can be applied to the audio data associated with the video data;

receiving, from the user, a selection of at least one audio effect to apply to the audio data associated with the video data;

sending, to the remote rendering server, the received indication of the at least one audio effect to apply to the audio data associated with the video data; and receiving, from the remote rendering server, modified audio data based on the at least one audio effect.

5. The method of claim 4 wherein the at least one audio effect is at least one of reverberation, filtering, noise reduction, or gain.

6. The method of claim 1 wherein the at least one controllable parameter is brightness, saturation, strength, or position.

7. The method of claim 1 wherein the at least one controllable parameter comprises at least one of detail, speed, randomness, tint, blur amount, width, length, quality, zoom, color, mix, enable, angle, combine, invert, opacity, reverse, variation, style, or sharpen.

8. A non-transitory computer-readable medium storing instructions that, if executed by a computing system, cause the computing system to perform operations comprising:

sending, to a remote rendering server, a least a portion of video data comprising one or more video frames;

receiving, from the remote rendering server, a web page, wherein the web page specifies one or more controls for applying visual effects to the video data; and with a browser executing on a processor of the computing system, providing for display an indication of one or more visual effects that can be applied to the video data, receiving, from a user, a selection of at least one visual effect to apply to the video data, wherein the at least one visual effect has at least one associated controllable parameter, sending, to the remote rendering server, an indication of the selected at least one visual effect to apply to the video data, wherein the remote rendering server is configured to apply the at least one visual effect to the video data, receiving, from the remote rendering server, first modified video data, wherein the first modified video data comprises one or more video frames modified based on the selected at least one visual effect; and while the first modified video data is being displayed, receiving, from the user, an indication to modify the at least one controllable parameter associated with the at least one visual effect, sending, to the remote rendering server, the indication to modify the at least one controllable parameter associated with the at least one visual effect, and receiving, from the remote rendering server, second modified video data based on the modified at least one controllable parameter associated with the at least one visual effect, so that the user can dynamically steer the application of the at least one visual effect to video data by the remote rendering server in real-time, and providing the second modified video data for display.

9. The non-transitory computer-readable medium of claim 8, the operations further comprising:

storing a modified first frame of video data;

associating a first value for the at least one controllable parameter with the stored modified first frame of video data;

storing a modified second frame of video data;

associating a second value for the at least one controllable parameter with the stored modified second frame of video data.

10. The non-transitory computer-readable medium of claim 9, the operations further comprising:

in response to receiving a request to apply the at least one visual effect to the first frame with the at least one controllable parameter set to the first value, retrieving the stored modified first frame of video data; and in response to receiving a request to apply the at least one visual effect to the second frame with the at least one controllable parameter set to the second value, retrieving the stored modified second frame of video data.

11. The non-transitory computer-readable medium of claim 8, wherein the video data has associated audio data, the operations further comprising:

providing for display an indication of one or more audio effects that can be applied to the audio data associated with the video data;

receiving, from the user, a selection of at least one audio effect to apply to the audio data associated with the video data;

sending, to the remote rendering server, the received indication of the at least one audio effect to apply to the audio data associated with the video data; and receiving, from the remote rendering server, modified audio data based on the at least one audio effect.

12. The non-transitory computer-readable medium of claim 8, the operations further comprising:

while the first modified video data is being displayed, manipulating the display of the one or more controls for applying visual effects to the video data based on parameter values set for each control and each frame of the modified video data.

13. The non-transitory computer-readable medium of claim 8, the operations further comprising:

with the browser executing on the processor of the computing system, receiving, from the user, a second selection of at least one visual effect to apply to the video data, sending, to the remote rendering server, an indication of the second selected at least one visual effect to apply to the video data, receiving, from the remote rendering server, second modified video data, providing the first modified video data and the second modified video data for simultaneous display within the browser, and receiving, from the user, a selection of preferred modified video data.

14. A system, having one or more hardware processors and at least one memory, the system comprising:

a component configured to receive, from a remote client computer, one or more video frames of video data;

a component configured to send, to the remote client computer, a web page specifying one or more controls for applying visual effects to the video data;

a component configured to receive, from a browser executing on the remote client computer, a selection of at least one visual effect to apply to the video frames, wherein the at least one visual effect has at least one associated controllable parameter;

a component configured to apply the selected at least one visual effect to the video frames to produce modified video data;

a component configured to send, to the remote client computer, the produced modified video data;

a component configured to, while the modified video data is being displayed, receive, from a user, an indication to modify the at least one controllable parameter associated with the at least one visual effect, receive, from the remote client computer, an indication to modify the at least one controllable parameter associated with the at least one visual effect, apply the selected at least one visual effect based on the modified at least one controllable parameter associated with the at least one visual effect to the video frames to produce second modified video data, and send, to the remote client computer, the produced second modified video data, so that the user can dynamically steer the application of the at least one visual effect to video data by the system in real-time, and a component configured to send, to the remote client computer, the produced second modified video data wherein each component comprises computer-executable instructions stored in the at least one memory for execution by at least one of the one or more hardware processors.

15. The system of claim 14, further comprising:

a component configured to identify additional video frames of the video data; and a component configured to speculatively apply the at least one visual effect to the identified additional video frames to produce third modified video data.

16. The system of claim 15, further comprising:

a component configured to delete the third modified video data in response to determining that the at least one controllable parameter associated with the at least one visual effect has been modified.

17. The system of claim 14, further comprising:

a component configured to receive, from the remote client computer, a request to render the entire video data based on one or more visual effects; and a component configured to send, in response to determining that the entire video data base been rendered, a notification comprising at least one of a text message, an email, or a social media posting to a user.

18. The system of claim 14, wherein the video data comprises 3-d models.

19. The system of claim 14 wherein the at least one associated controllable parameter comprises at least one of detail, speed, randomness, tint, blur amount, width, length, quality, zoom, or color.

20. The system of claim 14 wherein the at least one associated controllable parameter comprises at least one of mix, enable, angle, combine, invert, opacity, reverse, variation, style, or sharpen.

* * * * *

UNITED STATES PATENT AND TRADEMARK OFFICE
CERTIFICATE OF CORRECTION

PATENT NO. : 8,935,611 B2
APPLICATION NO. : 14/349178
DATED : January 13, 2015
INVENTOR(S) : Gary C. Oberbrunner et al.

Page 1 of 1

It is certified that error appears in the above-identified patent and that said Letters Patent is hereby corrected as shown below:

In the specification,

In column 4, line 67, delete "406b)" and insert -- 406b). --, therefor.

In the claims,

In column 10, line 37, in claim 1, delete "a least" and insert -- at least --, therefor.

In column 11, line 44, in claim 8, delete "a least" and insert -- at least --, therefor.

In column 14, line 2, in claim 14, delete "data" and insert -- data, --, therefor.

Signed and Sealed this
Twenty-third Day of February, 2016

Michelle K. Lee
*Director of the United States Patent and Trademark Office*